G. J. & F. T. CHANTINY.
TRACTION ENGINE.
APPLICATION FILED OCT. 11, 1916.

1,261,701.

Patented Apr. 2, 1918.
2 SHEETS—SHEET 1.

Witness
Thos. F. Knox

Inventors
George J. Chantiny
and Frank T. Chantiny
By Victor J. Evans
Attorney

G. J. & F. T. CHANTINY.
TRACTION ENGINE.
APPLICATION FILED OCT. 11, 1916.
1,261,701.
Patented Apr. 2, 1918.
2 SHEETS—SHEET 2.
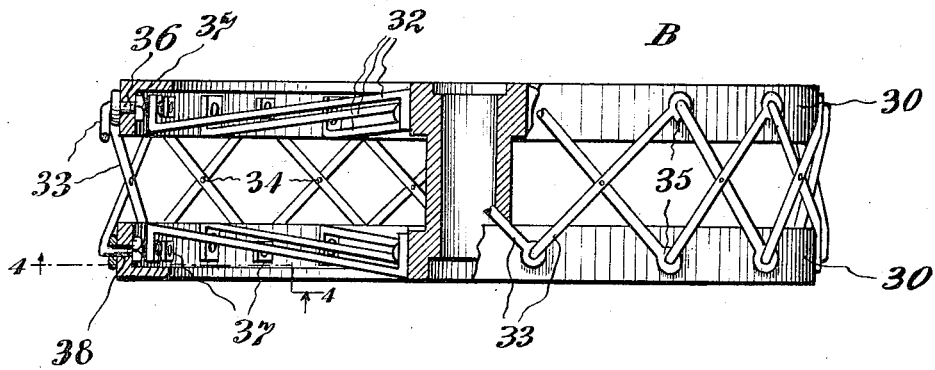
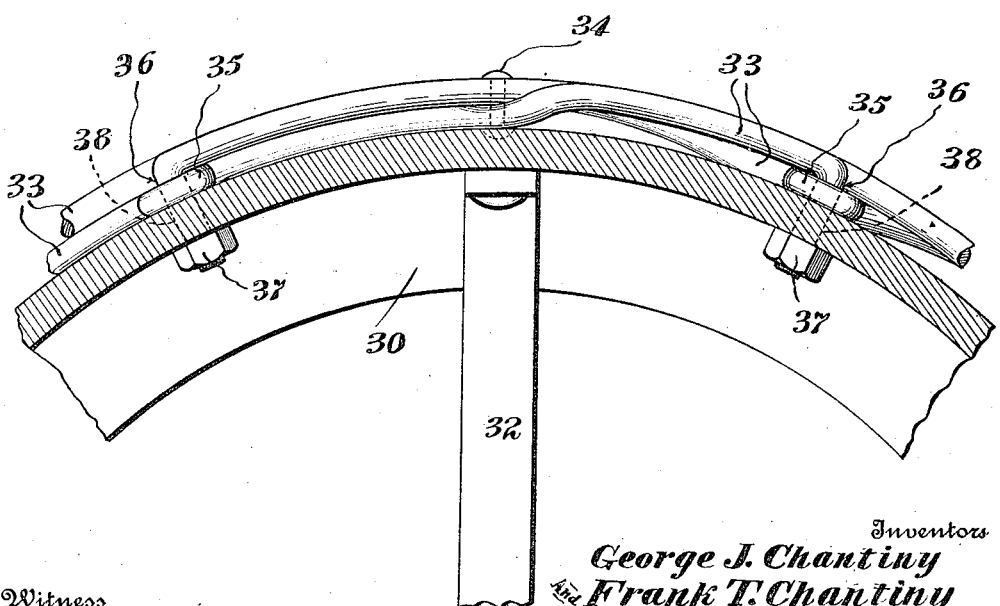
Inventors
George J. Chantiny
& Frank T. Chantiny
By Victor J. Evans
Attorney
Witness
Thos. F. Knox

UNITED STATES PATENT OFFICE.

GEORGE J. CHANTINY AND FRANK T. CHANTINY, OF SILVERWOOD, MICHIGAN.

TRACTION-ENGINE.

1,261,701.

Specification of Letters Patent.

Patented Apr. 2, 1918.

Application filed October 11, 1916. Serial No. 125,076.

*To all whom it may concern:*

Be it known that we, GEORGE J. CHANTINY and FRANK T. CHANTINY, citizens of the United States, residing at Silverwood, in the county of Tuscola and State of Michigan, have invented new and useful Improvements in Traction-Engines, of which the following is a specification.

This invention relates to traction engines, and it has for its object to simplify and improve the construction of the same.

A further and special object of the invention is to produce simple and improved traction wheels which will not slip on the slippery ground and which will be so constructed that mud will not readily adhere thereto.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Fig. 3 is a transverse sectional view of the traction wheel.

Fig. 4 is a sectional detail view taken on the line 4—4 in Fig. 3.

Corresponding parts in the several figures are denoted by like characters of reference.

Figure 1:
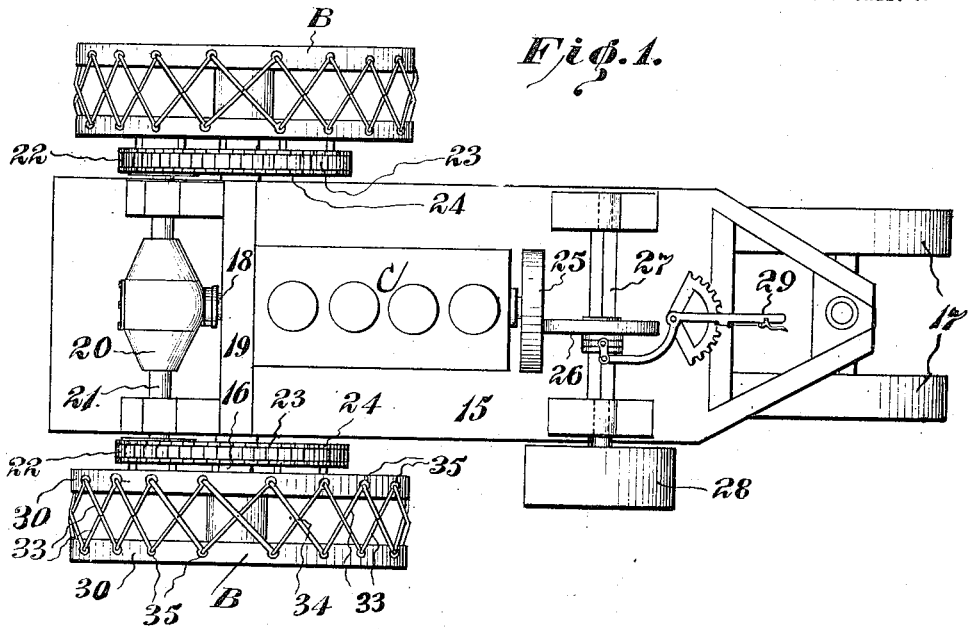
Figure 1 is a top plan view of a traction engine constructed in accordance with the invention.
Figure 2:
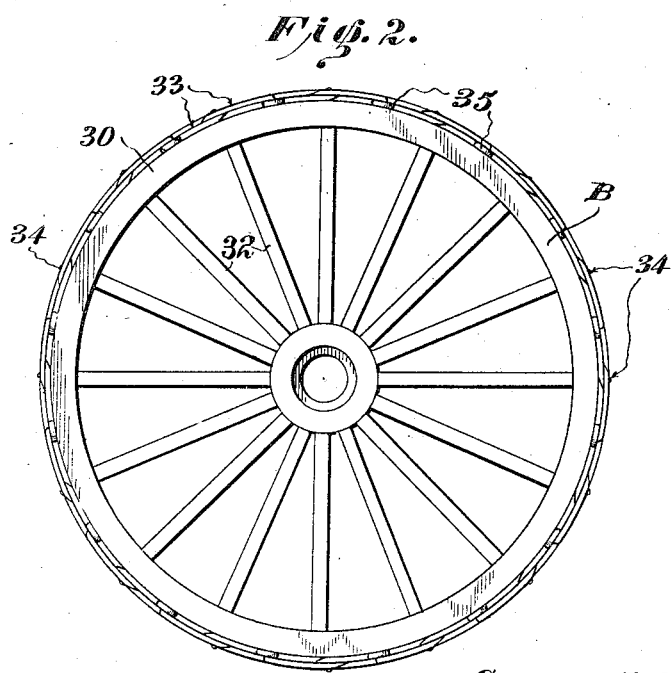
Fig. 2 is a side elevation of one of the traction wheels.

The tractor frame 15 is supported intermediate its ends on the main axle 16 having the traction wheels B. The forward end of the frame is supported upon the steering wheels 17 which may be constructed and arranged in any suitable conventional or well known manner. The motor C, which is supported on the tractor frame, has the main driven shaft 18 which is longitudinally disposed, said shaft being extended through a casing 19 containing a planetary transmission of conventional construction, not shown in detail, but capable of delivering two forward speeds and one reverse to the differential gear which is contained in a housing 20 and which drives the stub shaft 21 carrying sprockets 22 which are connected by chains 23 with sprocket wheels 24 on the traction wheels B. The forward end of the driven shaft 18 carries a fly wheel 25 consisting of a disk, the face of which is engaged by a friction wheel 26, the same being slidably mounted on a counter shaft 27 carrying a band wheel 28 which may be utilized for various purposes and the speed of which will be governed by the position of the friction wheel 26 relative to the fly wheel 25, said friction wheel being adjustable by means of a hand lever 29 and suitable connections, Each traction wheel B is composed of two separate rims 30, said rims being connected with a single hub by means of spokes 32. Each rim 30 is connected with and spaced from its mate by cross lugs or brace members 33, said cross lugs being arranged in pairs and each pair being connected together at the point of intersection by a rivet 34. Each lug is provided at one end, which for convenience will be designated as the forward end, with an eye 35, and each lug is provided at the other or rearward end with a hook 36 which is screw threaded for the reception of a nut 37. The rims, which may be constructed of angle steel or of other suitable material in any convenient manner, are apertured for the passage of the hooked ends of the respective cross lugs.

In assembling the parts, the eyes 35 of the respective cross lugs are alined with the apertures 38 in the rims for the passage of the hooks 36 of the cross lugs next in advance, the nuts 37 being applied to the said hooks and tightened securely upon the inner faces of the rims. It is obvious that the nuts may be omitted when desired and the hooks be simply clenched or upset on the inner faces of the rims. In this manner the rims will be securely connected together and spaced apart in such a manner as to provide ground engaging portions of great width, the cross lugs serving to prevent skidding and to enable the traction wheels to bite firmly in the ground.

The manner of connecting the ends of the cross lugs with the rims may be varied within the purview of the present invention without departing from the spirit of the same.

Having thus described the invention, what is claimed as new, is:—

1. A traction wheel having spaced rims and crossed lugs connecting the same, said crossed lugs being connected together at the points of intersection, and means for removably connecting the lugs to the rims.

2. A traction wheel having spaced rims and crossed lugs connecting the same, said lugs being connected together at the points of intersection, said lugs being each provided with a hook at one end and with an eye at the other end for the passage of the hook of the next adjoining lug.

3. A traction wheel having two spaced rims, the same being apertured at suitable intervals, and crossed lugs connecting the same, said crossed lugs being connected together at the points of intersection, each lug being provided at one end with an eye and at the other end with a hook engaging the eye of the next adjoining lug and extending through and connected with one of the rims.

In testimony whereof we affix our signatures.

GEORGE J. CHANTINY.
FRANK T. CHANTINY.

Copies of this patent may be obtained for five cents each, by addressing the "Commissioner of Patents, Washington, D. C."